US008426877B2

(12) United States Patent
Zhang et al.

(10) Patent No.: US 8,426,877 B2
(45) Date of Patent: Apr. 23, 2013

(54) BACKLIGHT MODULE

(75) Inventors: Yanxue Zhang, Guangdong (CN);
Yicheng Kuo, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 190 days.

(21) Appl. No.: 13/142,944

(22) PCT Filed: Apr. 26, 2011

(86) PCT No.: PCT/CN2011/073342
§ 371 (c)(1),
(2), (4) Date: Jun. 30, 2011

(87) PCT Pub. No.: WO2012/139309
PCT Pub. Date: Oct. 18, 2012

(65) Prior Publication Data
US 2012/0261682 A1    Oct. 18, 2012

(30) Foreign Application Priority Data
Apr. 14, 2011    (CN) .......................... 2011 1 0094001

(51) Int. Cl.
*H01L 33/00*    (2010.01)
*G09F 13/04*    (2006.01)
*G09F 13/08*    (2006.01)

(52) U.S. Cl.
USPC .......... 257/88; 257/98; 257/99; 257/E33.068; 257/E33.067; 257/E33.071; 362/97.3

(58) Field of Classification Search ................. 362/97.3; 257/88, 98, 99, E33.067, E33.068, E33.071
See application file for complete search history.

(56) References Cited

U.S. PATENT DOCUMENTS
8,210,700 B2 * 7/2012 Cho et al. .................... 362/97.1
(Continued)

FOREIGN PATENT DOCUMENTS
CN    1716347    1/2006
CN    2896004    5/2007
(Continued)

*Primary Examiner* — Victor A Mandala
(74) *Attorney, Agent, or Firm* — Muncy, Geissler, Olds & Lowe, PLLC

(57) ABSTRACT

A backlight module comprises a back plate, a first light source module, and an optical component. The optical component includes a side surface and a bottom surface perpendicularly connected to the side surface. The first light source module comprises a plurality of first LEDs disposed on the back plate and at the side surface of the optical component for emitting light at a first wavelength toward the side surface of the optical component. The light is directed in a specific direction by the optical component and then sent out from an emitting surface. The backlight module further comprises a second light source module. The second light source module comprises a plurality of second LEDs disposed near the bottom surface of the optical component for emitting light at a second wavelength toward the bottom surface of the optical component. Light produced after the light at the first wavelength mixes with the light at the second wavelength becomes white light after passing through the optical component.

17 Claims, 5 Drawing Sheets

U.S. PATENT DOCUMENTS

| | | | |
|---|---|---|---|
| 2007/0081321 A1* | 4/2007 | Ahn et al. | 362/97 |
| 2008/0157009 A1* | 7/2008 | Wittenberg et al. | 250/494.1 |
| 2009/0108283 A1* | 4/2009 | Kadotani et al. | 257/98 |
| 2009/0135592 A1* | 5/2009 | Hamada | 362/231 |
| 2010/0110337 A1 | 5/2010 | Shin et al. | |
| 2010/0231804 A1* | 9/2010 | Hisakawa | 348/725 |
| 2011/0234118 A1* | 9/2011 | Kim et al. | 315/291 |
| 2012/0003438 A1* | 1/2012 | Appleton et al. | 428/195.1 |
| 2012/0314445 A1* | 12/2012 | Masuda | 362/581 |

FOREIGN PATENT DOCUMENTS

| | | |
|---|---|---|
| CN | 101017280 | 8/2007 |
| CN | 101109833 | 1/2008 |
| CN | 101566290 | 10/2009 |
| CN | 101825246 | 9/2010 |
| CN | 102003685 | 4/2011 |

\* cited by examiner

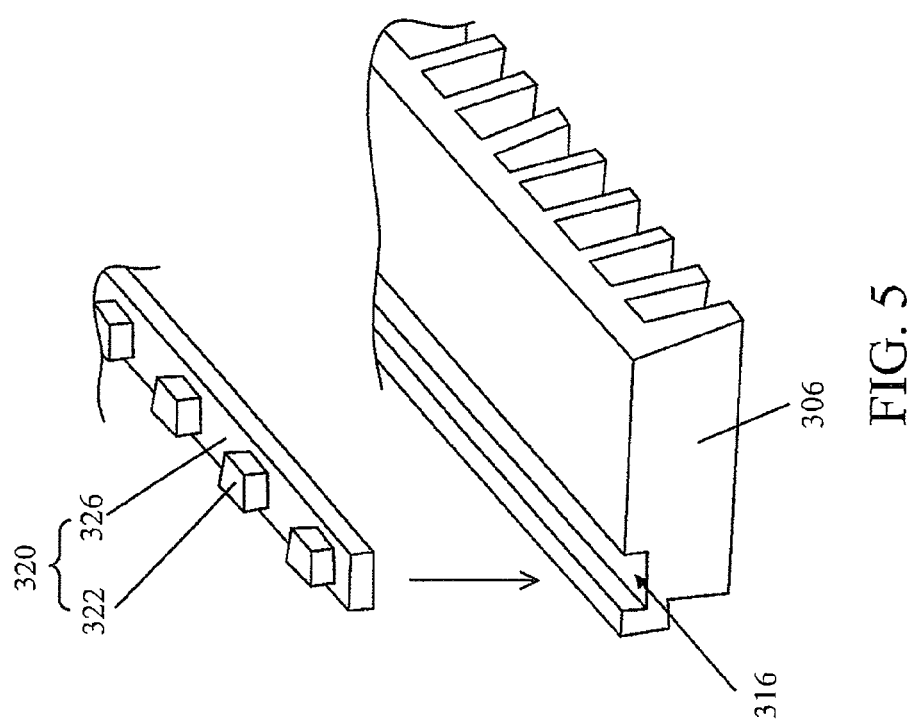

BACKLIGHT MODULE

CROSS-REFERENCE TO RELATED APPLICATIONS

This application is the National Stage of International Application No. PCT/CN2011/073342, filed Apr. 26, 2011, which claims the benefit of Chinese Application No. 201110094001.3 filed Apr. 14, 2011, the disclosures of which are incorporated herein by reference in their entireties.

BACKGROUND OF THE INVENTION

1. Field of the Invention

The present invention relates to a backlight module, and more particularly, to a backlight module capable of enhancing saturation of red light and enhancing image display quality.

2. Description of the Art

An advanced monitor with multiple functions is an important feature for use in current consumer electronic products. Liquid crystal displays (LCDs) which are colorful monitors with high resolution are widely used in various electronic products such as monitors for mobile phones, personal digital assistants (PDAs), digital cameras, laptop computers, and notebook computers.

A liquid crystal display (LCD) comprises a backlight module and a liquid crystal (LC) module. The backlight module comprises a backlight source, a back plate, and a light guide plate (LGP). The LC module comprises an LC panel and a front frame. Cold cathode fluorescent lamps (CCFLs) used to serve as a backlight source of the LCD, but they have been rapidly replaced by light emitting diodes (LEDs) owing to the characteristics of LEDs, that is, lower power consumption and mercury-free.

Nowadays, in an LCD using a plurality of LEDs as a light source, the plurality of LEDs are disposed on a printed circuit board (PCB) or a flexible printed circuit board (FPC) to form a light source module. Traditionally, a plurality of blue LEDs are commonly used as chips. The plurality of blue LEDs are combined with yellow phosphor when being packaged, and light that appears white to the human eye is produced. The white light produced in this way has red light constituent at low saturation, and the red light constituent is easily affected by temperature. The light emitted by the plurality of blue LEDs passes through a color filter (CF) for displaying an image. The displayed image in red constituent is distorted due to the low saturation of red light, which affects the display quality.

Therefore, there is a need to produce an LED backlight module to solve the problem occurring in the prior art.

SUMMARY OF THE INVENTION

An object of the present invention is to provide a backlight module. A plurality of red LEDs designed as a supplementary light source are increased at the bottom of the LGP of the backlight module to enhance saturation of red light, thereby enhancing image display quality.

According to the present invention, a backlight module comprises a back plate, a first light source module, and an optical component. The optical component comprises a side surface and a bottom surface perpendicularly connected to the side surface. The first light source module comprises a plurality of first light emitting diodes (LEDs) disposed on the back plate and at the side surface of the optical component for emitting light at a first wavelength toward the side surface of the optical component. The backlight module further comprises a second light source module and a reflector sheet. The second light source module comprises a plurality of second LEDs disposed near the bottom surface of the optical component for emitting light at a second wavelength toward the bottom surface of the optical component. Light produced after the light at the first wavelength being mixed with the light at the second wavelength becomes white light after passing through the optical component. The optical component comprises an inclined surface connected to the side surface and to an emitting surface. The reflector sheet is attached onto the inclined surface for reflecting a portion of the light at the second wavelength refracted at the inclined surface.

According to the present invention, a backlight module comprises a back plate, a first light source module, and an optical component. The optical component comprises a side surface and a bottom surface perpendicularly connected to the side surface. The first light source module comprises a plurality of first LEDs disposed on the back plate and at the side surface of the optical component. The plurality of first LEDs are used for emitting light at a first wavelength toward the side surface of the optical component. The backlight module further comprises a second light source module comprising a plurality of second LEDs disposed near the bottom surface of the optical component for emitting light at a second wavelength toward the bottom surface of the optical component. Light produced after the light at the first wavelength being mixed with the light at the second wavelength becomes white light after passing through the optical component.

In one aspect of the present invention, the optical component comprises an inclined surface connected to the side surface and to an emitting surface of the optical component.

In another aspect of the present invention, the plurality of second LEDs are disposed under the inclined surface, and the plurality of second LEDs produce light at the second wavelength emitted into the optical component through the bottom surface and directed to the optical component after being totally reflected by the inclined surface.

In still another aspect of the present invention, the backlight module further comprises a first heat sink disposed on the back plate for supporting the plurality of first LEDs. A groove is formed on the first sink heat facing the bottom surface of the optical component, and the plurality of second LEDs are disposed in the groove.

In yet another aspect of the present invention, a plurality of openings are formed in the back plate, and the plurality of second LEDs are engaged with the plurality of openings and face the bottom surface of the optical component. The backlight module further comprises a second heat sink for supporting the plurality of second LEDs.

In still another aspect of the present invention, the plurality of first LEDs are arranged alternatively with the plurality of second LEDs.

In still another aspect of the present invention, the plurality of first LEDs are arranged in alignment with the plurality of second LEDs.

Contrast to the prior art, the plurality of red LEDs designed as a supplementary light source are increased at the bottom of the optical component according to the present invention. Light emitted by the plurality of red LEDs can be totally reflected by the inclined surface of the wedge-shaped optical component. In this way, effects of red color display on the frame are greatly enhanced, which enhances color saturation, thereby improving the display on the frame. Moreover, an additional reflector sheet is attached onto the inclined surface, so that a portion of light refracted at the inclined surface can be reflected by the reflector sheet, thereby increasing the utilization of light.

These and other features, aspects and advantages of the present disclosure will become understood with reference to the following description, appended claims and accompanying figures.

BRIEF DESCRIPTION OF THE DRAWINGS

FIG. 5 is a decomposition diagram of a second light source module and a second heat sink shown in FIG. 4.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
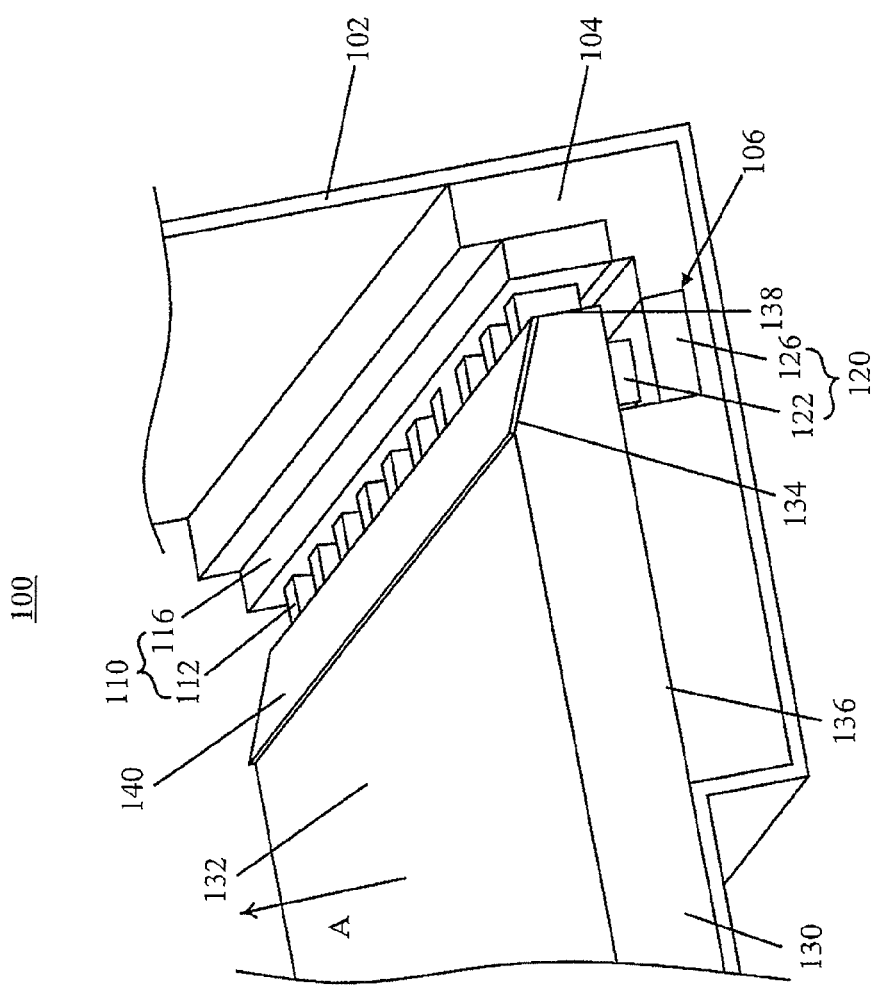
FIG. 1 is a local schematic diagram depicting a backlight module according to a first embodiment of the present invention.

Refer to FIG. 1, which is a local schematic diagram depicting a backlight module 100 according to a first embodiment of the present invention. The backlight module 100 comprises a back plate 102, a first light source module 110, a second light source module 120, and an optical component 130. The first light source module 110 and the second light source module 120 are used for producing light.

The optical component 130 is a light guide plate (LGP) comprising an emitting surface 132, a side surface 138, and a bottom surface 136 perpendicularly connected to the side surface 138. Light sent out by the first light source module 110 and the second light source module 120 is emitted toward the side surface 138 and the bottom surface 136 of the optical component 130. The light is directed in a specific direction A by the optical component 130 and then sent out from the emitting surface 132. One terminal of the side surface 138 of the optical component 130 is wedge-shaped; that is, an inclined surface 134 is formed at one terminal of the emitting surface 132. The inclined surface 134 is connected to the emitting surface 132 and the side surface 138. Preferably, a diffusing structure (not shown) is arranged on the bottom surface 136 of the optical component 130. After the light is emitted into the diffusing structure in the bottom surface 136, the reflected light diffuses everywhere, destroys conditions for total internal reflection, and finally is emitted upwards through the emitting surface 132 of the optical component 130, as indicated by arrow A. The optical component 130 can be evenly illuminated by utilizing the diffusing structure having a pattern design with different densities and sizes. The diffusing structure can also be a structure of granular material with different indices of refraction. The light is emitted evenly from the emitting surface 132 of the optical component 130 by means of the light-scattering granules.

Figure 2:
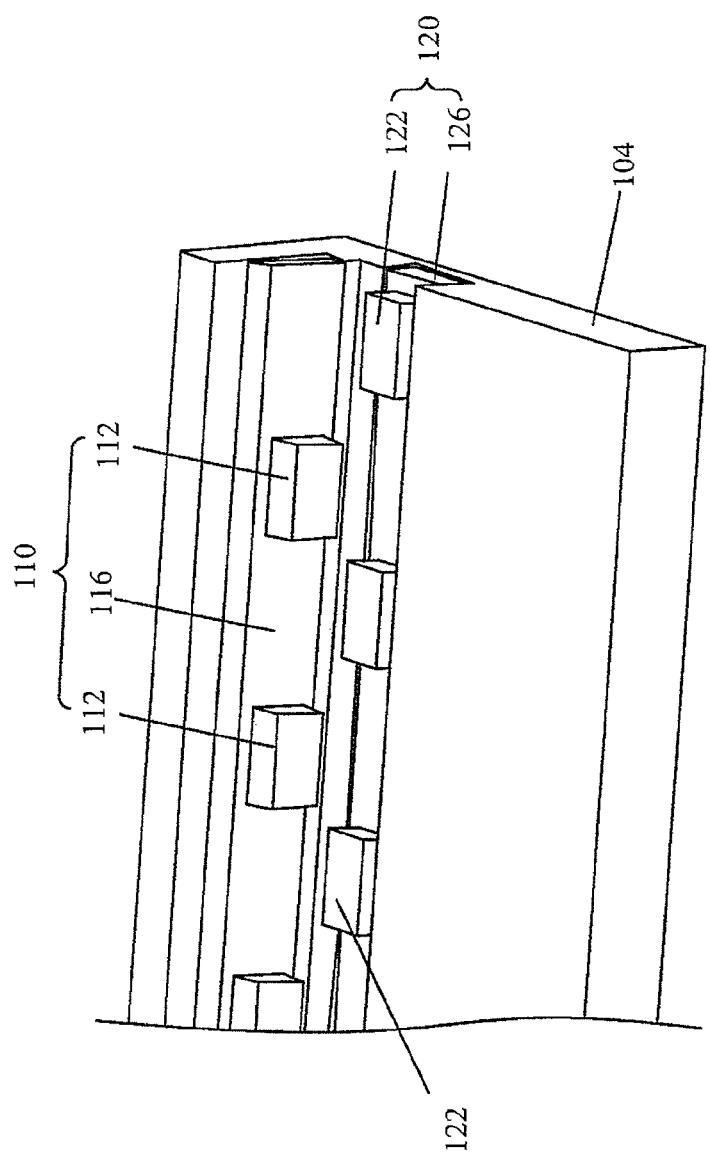
FIG. 2 is a local combinational schematic diagram depicting a first embodiment of a first light source module and a second light source module of a backlight module shown in FIG. 1 according to the present invention.

Please refer to FIG. 1 and FIG. 2. The first light source module 110 comprises a first substrate 116 where a plurality of first LEDs 112 are disposed. The first light source module 110, disposed near the side surface 138 of the optical component 130, produces light at a first wavelength and then emits the light at the first wavelength to the side surface 138 of the optical component 130. The second light source module 120 comprises a second substrate 126 where a plurality of second LEDs 122 are disposed. The second light source module 120, disposed near the bottom surface 136 and under the inclined surface 134 of the optical component 130, produces light at a second wavelength and then sends out light at the second wavelength to the bottom surface 136 of the optical component 130. The plurality of first LEDs 112 are arranged alternatively with the plurality of second LEDs 122. The first substrate 116 and the second substrate 126 can be a PCB, an FPC, or a metallic substrate.

Firstly, light emitted by the plurality of second LEDs 122 enters the optical component 130 through the bottom surface 136. Next, the light is reflected by the inclined surface 134. Finally, the light is directed to the diffusing structure in the bottom surface 136 of the optical component 130. However, a portion of light emitted by the plurality of second LEDs 122 is still refracted at the inclined surface 134. In a preferred embodiment, to utilize the refracted light more effectively, a reflector sheet 140 is attached onto the inclined surface 134 for reflecting light produced by the plurality of second LEDs 122 and refracted at the inclined surface 134.

To effectively dissipate thermal energy produced by the plurality of first LEDs 112 and the plurality of second LEDs 122 when operating, the plurality of first LEDs 112 and the plurality of second LEDs 122 are disposed on a first heat sink 104. The first heat sink 104, disposed between the back plate 102 and the optical component 130, is made of materials with high thermal conductivity, such as aluminum, copper, and other kind of metal. In a preferred embodiment, a groove 106 is disposed on one side surface of the first heat sink 104 facing the bottom surface 136. The plurality of second LEDs 122 and the second substrate 126 are embedded in the groove 106. Thermal energy produced by the plurality of first LEDs 112 and the plurality of second LEDs 122 when operating is conducted to the first heat sink 104, and is dissipated by air convection.

In a preferred embodiment, light at the first wavelength emitted by the plurality of first LEDs 112 is mixed with light at the second wavelength emitted by the plurality of second LEDs 122. The mixed light passes through the optical component 130 and light that appears white to the human eye is produced. For instance, the plurality of first LEDs 112 consist of the combination of blue LED chips and yellow phosphor in package to produce white light. The white light produced in this way has red light constituent at low saturation, and the red light constituent is easily affected by temperature. After light emitted by the plurality of first LEDs 112 passes through a color filter and displays an image of an object, the displayed image in red constituent is distorted due to the low saturation of red light, which affects the display quality. Therefore, red LED chips are used in the plurality of second LEDs 122 for complementing red light constituent to solve a problem of inadequate red light constituent in white light emitted by the plurality of first LEDs 112.

Figure 3:
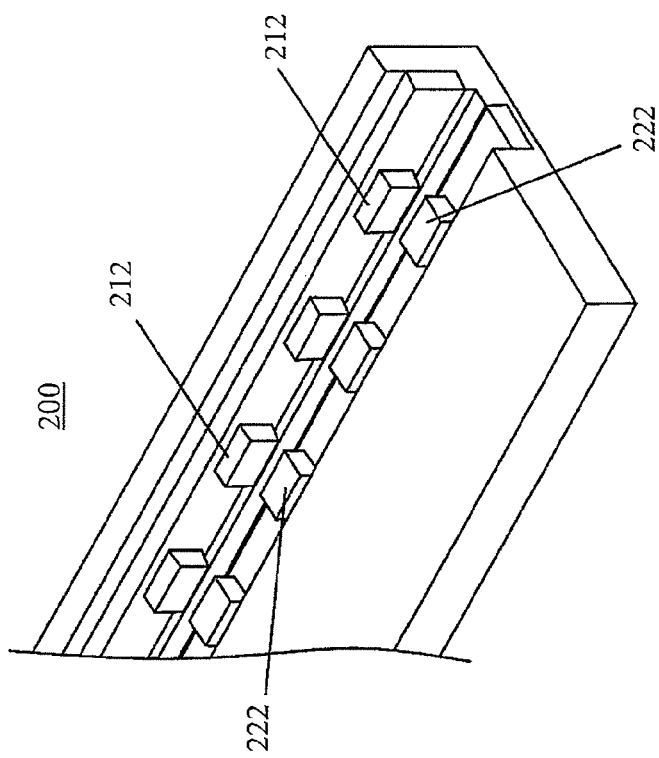
FIG. 3 is a local combinational schematic diagram depicting a second embodiment of a first light source module and a second light source module of a backlight module according to the present invention.

Refer to FIG. 3, which is a local combinational schematic diagram depicting a second embodiment of a first light source module and a second light source module of a backlight module. The backlight module 200 of the present embodiment is almost similar to the backlight module 100 of the first embodiment, except for a plurality of first LEDs 212 arranged in alignment with a plurality of second LEDs 222 in the present embodiment.

Figure 4:
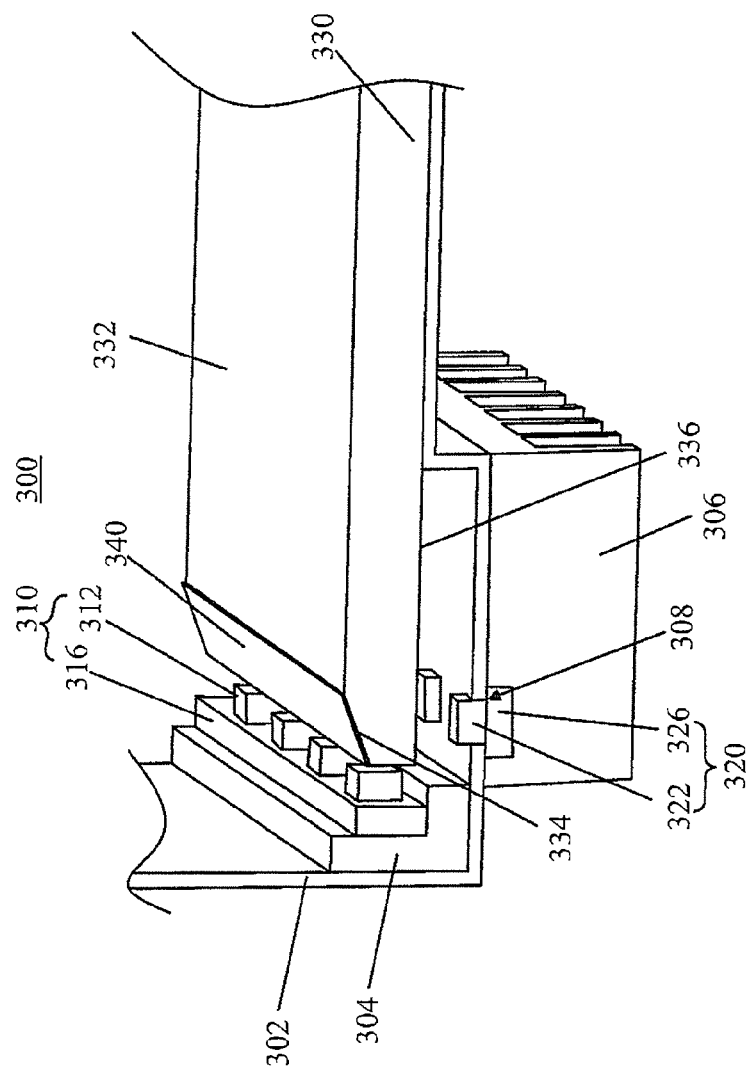
FIG. 4 is a local schematic diagram depicting a backlight module according to a third embodiment of the present invention.

Please refer to FIG. 4 and FIG. 5. FIG. 4 is a local schematic diagram depicting a backlight module 300 according to a third embodiment of the present invention. FIG. 5 is a decomposition diagram of a second light source module 320 and a second heat sink 306 shown in FIG. 4. To simplify the descriptions of the present invention, only structures and functions that are different from those in the first embodiment are provided hereafter.

The difference between the backlight module 300 of this embodiment and the backlight module 100 of the first embodiment is that, a plurality of openings 308 are formed in a back plate 302 of the backlight module 300. A plurality of second LEDs 322 pass through and are engaged with the plurality of openings 308 at the outer side surface of the back plate 302 towards an optical component 330. To effectively dissipate thermal energy produced by a plurality of first LEDs 312 and the plurality of second LEDs 322 when operating, the plurality of first LEDs 312 and the plurality of second LEDs 322 are disposed on a first heat sink 304 and the second heat sink 306, respectively. The first heat sink 304 is disposed between the back plate 302 and the optical component 330. The second heat sink 306 is disposed at the outer side surface of the back plate 302. The first heat sink 304 and the second heat sink 306 can be made of materials with high thermal conductivity, such as aluminum, copper, and other kind of metal. In a preferred embodiment, a groove 316 is disposed on one side surface of the second heat sink 306 facing a bottom surface 336 of the optical component 330. The plurality of second LEDs 322 are disposed on a second substrate 326 and embedded in the groove 316. Thermal energy produced by the plurality of first LEDs 312 and the plurality of second LEDs 322 when operating is conducted to the first heat sink 304 and the second heat sink 306 and then is dissipated by air convection.

The plurality of first LEDs 312 and the plurality of second LEDs 322 of the backlight module 300 can be alternatively arranged as shown in FIG. 2 or can be arranged in alignment as shown in FIG. 3. In addition, light emitted by the plurality of first LEDs 312 is not limited to white light. Light emitted by the plurality of second LEDs 322 is not limited to red light. Those with ordinary skill in the art can adjust the desired wavelength of light and the desired strength of light depending on practical requirements according to the descriptions of the present embodiment. Moreover, the present embodiment is an exemplary one applied to an LCD. However, any other kind of display device needing LEDs (particularly needing white LEDs) as a backlight source can be adjusted correspondingly according to the embodiments of the present invention.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A backlight module comprising a back plate, a first light source module, and an optical component, the optical component comprising a side surface and a bottom surface perpendicularly connected to the side surface, the first light source module comprising a plurality of first light emitting diodes (LEDs) disposed on the back plate and at the side surface of the optical component for emitting light at a first wavelength toward the side surface of the optical component, characterized in that: the backlight module further comprises a second light source module and a reflector sheet, the second light source module comprises a plurality of second LEDs disposed near the bottom surface of the optical component for emitting light at a second wavelength toward the bottom surface of the optical component, light produced after the light at the first wavelength being mixed with the light at the second wavelength becomes white light after passing through the optical component, the optical component comprises an inclined surface connected to the side surface and to an emitting surface, and the reflector sheet is attached onto the inclined surface for reflecting a portion of the light at the second wavelength refracted at the inclined surface.

2. The backlight module of claim 1, characterized in that: the plurality of second LEDs are disposed under the inclined surface, and the plurality of second LEDs produce light at the second wavelength emitted into the optical component through the bottom surface and directed to the optical component after being totally reflected by the inclined surface.

3. The backlight module of claim 1, characterized in that: the backlight module further comprises a first heat sink disposed on the back plate for supporting the plurality of first LEDs.

4. The backlight module of claim 3, characterized in that: a groove is formed on the first sink heat facing the bottom surface of the optical component, and the plurality of second LEDs are disposed in the groove.

5. The backlight module of claim 1, characterized in that: a plurality of openings are formed in the back plate, and the plurality of second LEDs are engaged with the plurality of openings and face the bottom surface of the optical component.

6. The backlight module of claim 5, characterized in that: the backlight module further comprises a second heat sink for supporting the plurality of second LEDs.

7. The backlight module of claim 1, characterized in that: the plurality of first LEDs are arranged alternatively with the plurality of second LEDs.

8. The backlight module of claim 1, characterized in that: the plurality of first LEDs are arranged in alignment with the plurality of second LEDs.

9. A backlight module comprising a back plate, a first light source module, and an optical component, the optical component comprising a side surface and a bottom surface perpendicularly connected to the side surface, the first light source module comprising a plurality of first LEDs disposed on the back plate and at the side surface of the optical component, the plurality of first LEDs for emitting light at a first wavelength toward the side surface of the optical component, characterized in that: the backlight module further comprises a second light source module, the second light source module comprises a plurality of second LEDs disposed near the bottom surface of the optical component for emitting light at a second wavelength toward the bottom surface of the optical component, and light produced after the light at the first wavelength being mixed with the light at the second wavelength becomes white light after passing through the optical component.

10. The backlight module of claim 9, characterized in that: the optical component comprises an inclined surface connected to the side surface and to an emitting surface of the optical component.

11. The backlight module of claim 10, characterized in that: the plurality of second LEDs are disposed under the inclined surface, and the plurality of second LEDs produce light at the second wavelength emitted into the optical component through the bottom surface and directed to the optical component after being totally reflected by the inclined surface.

12. The backlight module of claim 9, characterized in that: the backlight module further comprises a first heat sink disposed on the back plate for supporting the plurality of first LEDs.

13. The backlight module of claim 12, characterized in that: a groove is formed on the first sink heat facing the bottom surface of the optical component, and the plurality of second LEDs are disposed in the groove.

14. The backlight module of claim 9, characterized in that: a plurality of openings are formed in the back plate, and the plurality of second LEDs are engaged with the plurality of openings and face the bottom surface of the optical component.

15. The backlight module of claim 14, characterized in that: the backlight module further comprises a second heat sink for supporting the plurality of second LEDs.

16. The backlight module of claim 9, characterized in that: the plurality of first LEDs are arranged alternatively with the plurality of second LEDs.

17. The backlight module of claim 9, characterized in that: the plurality of first LEDs are arranged in alignment with the plurality of second LEDs.

* * * * *